United States Patent [19]

Haker

[11] Patent Number: 5,419,210

[45] Date of Patent: May 30, 1995

[54] HIGH CAPACITY WEIGH MODULE

[75] Inventor: Khalil D. Haker, Marlboro, Mass.

[73] Assignee: BLH Electronics, Inc., Canton, Mass.

[21] Appl. No.: 333,866

[22] Filed: Nov. 3, 1994

Related U.S. Application Data

[63] Continuation of Ser. No. 28,280, Mar. 9, 1993, abandoned.

[51] Int. Cl.6 .............................................. G01L 1/22
[52] U.S. Cl. ........................ 73/862.631; 73/862.632; 73/862.637
[58] Field of Search ................. 73/862.621, 862.622, 73/862.625, 862.627, 862.629, 862.631–862.639, 862.642

[56] References Cited

U.S. PATENT DOCUMENTS

| D. 306,144 | 2/1990 | Haggstrom . | |
|---|---|---|---|
| 3,037,178 | 5/1962 | Pien . | |
| 3,091,961 | 6/1963 | Piell | 73/768 |
| 3,136,157 | 6/1964 | Seed et al. . | |
| 3,554,025 | 1/1971 | Andersson et al. . | |
| 3,669,756 | 6/1972 | Bradley . | |
| 3,695,096 | 10/1972 | Kutsay | 73/862.631 |
| 3,958,456 | 5/1976 | Jacobson . | |
| 3,985,025 | 10/1976 | Ormond . | |
| 4,094,192 | 6/1978 | Watson et al. . | |
| 4,151,502 | 4/1979 | Kurihara et al. . | |
| 4,283,941 | 8/1981 | Kutsay | 73/862.635 |
| 4,453,422 | 6/1984 | Yorgiadis . | |
| 4,516,646 | 5/1985 | Bergfalk | 73/862.632 |
| 4,573,362 | 3/1986 | Amlani . | |
| 4,688,421 | 8/1987 | Pzsolla . | |
| 4,758,692 | 7/1988 | Roeser et al. . | |
| 4,854,179 | 8/1989 | Haggstrom . | |
| 5,005,429 | 4/1991 | Haggstrom . | |

FOREIGN PATENT DOCUMENTS

| 2234025 | 1/1974 | Germany | 73/862.637 |
|---|---|---|---|
| 2409372 | 2/1974 | Germany . | |
| 3614989A1 | 5/1986 | Germany . | |
| 8080534 | 5/1983 | Japan | 73/862.627 |
| 60-40930 | 3/1985 | Japan . | |
| 1038225 | 8/1966 | United Kingdom | 73/862.627 |
| 563583 | 6/1977 | U.S.S.R. | 73/862.632 |

OTHER PUBLICATIONS

BLH, "Z-Blok Weigh Module", PD423, Aug. 1988.
BLH, "Load Beams", Cat. No. 403, effective May 1977, pp. 5–13.
BLH, "Kis Series Weigh Modules", PD404, Dec. 1992.
BLH, Transducers, "KIS Series Weigh Modules", PD 404, Jun., 1988.

Primary Examiner—Robert Raevis
Attorney, Agent, or Firm—Fish & Richardson

[57] ABSTRACT

A strain gauge transducer includes several features for enhancing operating life and improving measurement accuracy. Load force is applied transversely to the longitudinal axis of a load member that is configured to flex in the transverse direction in response to the load force, and the load member is constructed so that the material of the load member circumferentially surrounds device (e.g., one or more strain gauges) for measuring the force-induced flexure of the member. The load member and a mounting member that receives the load force and transfers it to the load member are configured to allow the mounting member to pivot about the axes of the load member and the mounting member and to inhibit the mounting member from moving along one of the axes. The ends of the load member are configured to roll within openings of side walls that support the load member above a base as said load member flexes in response to the load force.

23 Claims, 5 Drawing Sheets

HIGH CAPACITY WEIGH MODULE

This is a continuation of application Ser. No. 08/028,280, filed Mar. 9, 1993, now abandoned.

The invention relates generally to weigh modules, and more particularly to transducers which use strain gauges to determine the weights of objects.

BACKGROUND OF THE INVENTION

Strain gauges are often used to measure forces, such as the deformation induced in a member by a load placed on the member, as a means of determining the weight of the load. A typical strain gauge transducer comprises the member (e.g., a cylindrical metal beam) and one or more strain gauges, which are configured as an electrical bridge circuit. The beam deforms as force is applied by a load. The bridge circuit has a plurality of arms, each of which includes an electrical resistor which is also deformed in conformity with the deformation of the beam.

The deformation of the resistors causes variations in resistance of one or more of the arms of the electrical bridge, effectively unbalancing it. Electronic circuitry measures the amount of the unbalancing of the bridge and determines therefrom the degree of deformation of the beam. From the information relating to the degree of deformation, and from the transducer's materials and design, the amount of strain being applied to the strain gauge—and hence the weight of the load—is determined.

The structure of the transducer is typically varied based on the particular application in which the strain gauge transducer is used. For example, in some strain gauge transducers, the beam is oriented vertically (i.e., in the same direction in which the load forces are applied). In others, the beam is oriented horizontally and is supported either in cantilevered fashion or at both ends.

In horizontal configurations, the electrical resistors that form the strain gauge are typically mounted to a so-called "shear-web" disposed in the interior of the beam. The shear-web is formed by cutting slots into the beam from both sides, leaving an elongated, flat vertical section of metal—the "web"—in the center of the beam (thus, in cross-section, the beam resembles an "I-beam"). The strain gauges are then attached to the web. The slots are either left open or covered with an electrical insulator, such as Teflon.

SUMMARY OF THE INVENTION

In one general aspect of the invention, load force is applied in a direction transverse to the longitudinal axis of a load member that is made from a material configured to flex in the transverse direction in response to the load force; the load member supports a device for measuring the force-induced flexure and is constructed so that the material of the load member surrounds the device over the circumference of the load member.

Preferred embodiments include the following features.

Am axial bore is disposed in the load member, and the measuring device (e.g., a strain gauge) is disposed on a surface of the bore surrounded by the load member. Multiple strain gauges are used. At least some of the strain gauges are axially spaced from each other; others are circumferentially spaced from each other on the surface of the bore (such as by 180°). The bore can extend completely through the load member, or not.

The strain gauges are well protected from such moisture, corrosion, abrasion, and other deleterious effects by the structure of the load member itself. The strain gauges are easily and completely sealed from the external environment by closing the ends of the bore. As a result, the operating life of the strain gauge transducer is greatly enhanced over a "shear-web" transducer, which only partially surrounds the strain gauges with the load member and relies on the material that fills the slots to protect the strain gauges from moisture and the like.

Further, because sections of the load member are not removed to form a shear-web, the load member is equally strong in the vertical and horizontal planes (unlike shear-web devices, which are typically weaker in the horizontal plane). Thus, sideloads induced by vibration, wind, or process dynamics have less effect on the strain gauge transducer than on shear-web devices. Moreover, the load member is easier to make than that of a shear-web transducer, because the need to cut slots in the member and subsequently fill the slots is eliminated.

In another aspect of the invention, the load member and a mounting member that receives the load force and transfers it to the load member are configured to allow the mounting member to pivot about the axes of the load member and the mounting member and to inhibit the mounting member from moving along one of the axes.

This configuration renders the strain gauge transducer highly insensitive to shifts in the position of the load caused by such factors as thermal expansion and contraction. Because the mounting member is permitted to pivot in multiple directions, load shifts are accommodated without imposing undue stresses on mounting hardware used to attach the load to the transducer.

Preferred embodiments include the following features.

In one embodiment, the load member includes a depression in a surface thereof for receiving the mounting member. The depression is configured to allow the mounting member to pivot about the axes but inhibit the mounting member from moving along the axis of the load member. This feature ensures equal application of the load to the strain gauges, which are equally axially spaced from the depression, thereby improving measurement accuracy.

The load member axis and the mounting member axis are perpendicular to each other. The depression is generally cup-shaped—defining a surface that is concave along the axis of the load member and a surface that is convex with respect to the axis of the mounting member. The mounting member includes a curved portion configured to rest on the concave surface, thereby to facilitate pivoting of the mounting member about its axis. The radius of curvature of the concave surface exceeds that of the curved portion of the mounting member. The convex surface facilitates pivoting of the mounting member about the axis of the load member. The load member is enlarged for added strength in the region in which the cup is disposed.

In another embodiment, a cup-shaped depression is formed on the mounting member and is aligned with an enlarged region of the load member. The depression and the enlarged region are configured to allow said mounting member to pivot about both axes but inhibit the mounting member from moving along its axis. The enlarged region is curved along the axis of the mounting member, and the depression defines a surface that is concave along that axis to receive the enlarged region. This facilitates pivoting of the mounting member about the axis of the load member. The concave surface has a radius of curvature that is greater than that of the enlarged region.

Another aspect of the invention features configuring the ends of the load member to roll within openings of side walls that support the load member above a base as the load member flexes in response to the load force.

This support arrangement reduces the lateral restraint imposed by the side walls on the ends of the load member. As a result, the ends are relatively free to move laterally as the load member flexes in response to the load. The load member thus closely approximates a "simply supported beam," and measurement accuracy is increased.

Preferred embodiments include the following features.

Each end includes an enlarged region for engaging an interior surface of a side wall opening and spacing the remaining regions of the end that are disposed within the side wall from the interior surface. The enlarged regions are each curved along the longitudinal axis of the load member. Each enlarged region defines a section of a sphere. The base is sufficiently thick to avoid the side walls flexing toward each other in response to the load force.

The ends are generally circular in cross-section, and each opening is configured so that at least a portion of the opening is non-circular (e.g., parabolic or hyperbolic). The non-circular portion of the opening is positioned under the load member with respect to the direction in which the load force is applied. The non-circular configuration of the openings results in a relatively large contact area between the ends of the load member and the side walls. As a result, the weight of the load is somewhat distributed over the interior surface of the openings. This further enhances the approximation of the load member as a simply supported beam, by reducing the risk of the ends of the beam becoming flattened in response to the weight of the load, which would hamper the ability of the ends to roll within the side walls.

The openings in the side walls circumferentially surround the ends of the load member. This provides anti-lift protection by capturing the load member within the weigh module.

Other features and advantages of the invention will become apparent from the following detailed description, and from the claims.

DETAILED DESCRIPTION OF THE PREFERRED EMBODIMENTS

Figure 1:
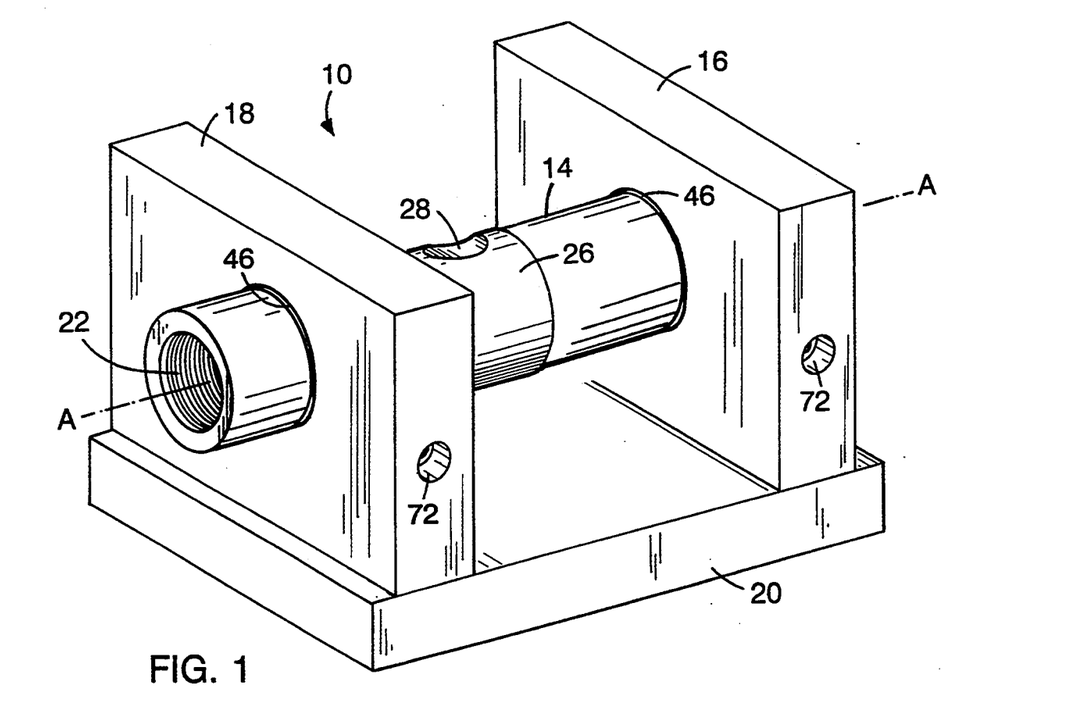
FIG. 1 shows a load beam module of a strain gauge transducer according to one embodiment of the invention.
Figure 2:
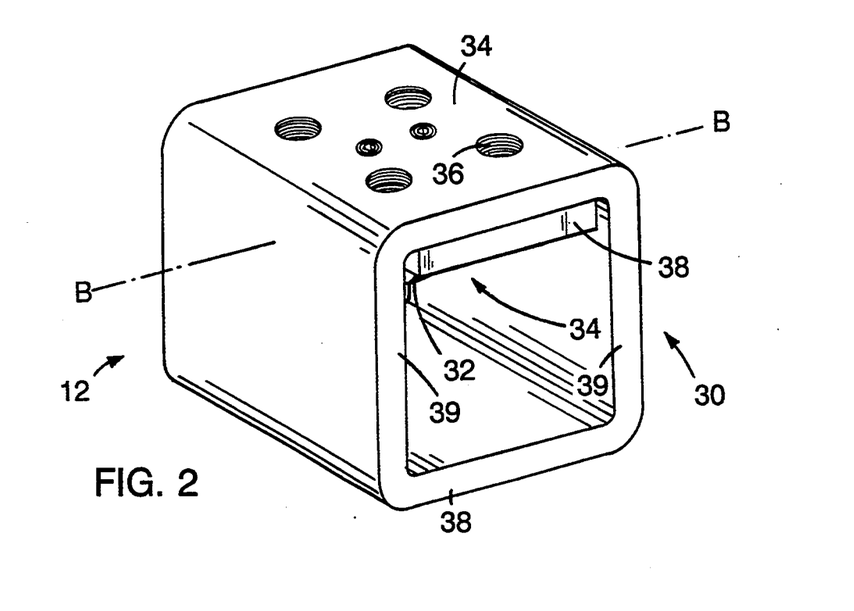
FIG. 2 shows a load yoke module used with the load beam module of FIG. 1.

Referring to FIGS. 1 and 2, the strain gauge transducer of the invention includes a load beam module 10 and a load yoke module 12, shown separately for ease of description.

Load beam module 10 includes a load beam 14 suspended above a base 20 between a pair of side walls 16, 18. As described in detail below, the construction of load beam 14 and the manner in which load beam 14 is suspended by walls 16, 18 are such that load beam 14 approximates the classic "simply supported beam" in response to the weight of an applied load. That is, the central region of load beam 14 flexes downwardly and the ends of load beam 14 "roll" within side walls 16, 18 in response to the load. Side walls 16, 18 and base 20 of load beam module 10 are all relatively thick to remain stationary as load beam 14 flexes. Each side wall 16, 18 is secured to base 20 by a pair of bolts (not shown) advanced from the underside of base 20.

Load beam 14 is generally cylindrical and includes a bore 22 (FIG. 5) disposed along the longitudinal axis A of and completely through load beam 14. Two sets of strain gauges 24a, 24b (FIG. 5) are mounted on curved interior surface that defines bore 22 and are equally spaced from the axial centerline 15 (FIG. 5) of load beam 14. Thus, strain gauges 24a, 24b are surrounded by the material (hardened steel) of load beam 14 over the entire circumference of beam 14. Disposing strain gauges 24a, 24b within load beam 14 in this manner protects strain gauges 24a, 24b from moisture and other corrosive effects.

An enlarged, convex flange 26 is disposed around the circumference of load beam 14 about axial centerline 15 to provide additional strength to support load yoke module 12, which rests on load beam 14 at its axial center. A cup-shaped depression 28 disposed in flange 26 at the apex of load beam 14 receives load yoke module 12. Cup 28 is formed symmetrically about centerline 15. As explained below, cup 28 is shaped like a saddle—cup 28 is highly concave along axis a and is slightly convex in a direction perpendicular to axis A (although the radius of curvature of cup 28 is less than that of load beam 14).

Load yoke module 12 includes a rectangular housing 30 that supports a semi-cylindrical load button 32 centrally beneath a table surface 34. Table surface 34 is flat to receive the load (not shown) that is to be measured by the strain gauge transducer module. A set of holes 36 in table surface 34 allow the load to be bolted or otherwise secured to housing 30 (if the size of the load requires, an enlarged mounting plate (not shown) can be bolted to table surface 34, and the load can be secured to the plate). Load button 32 is bolted to the underside of table surface 34 via a plate 38 so that the semi-cylindrical portion of load button 32 faces the interior of housing 30. A lower wall 38 joins a pair of vertical side walls 39 to complete the rectangular frame defined by housing 30.

Figure 3:
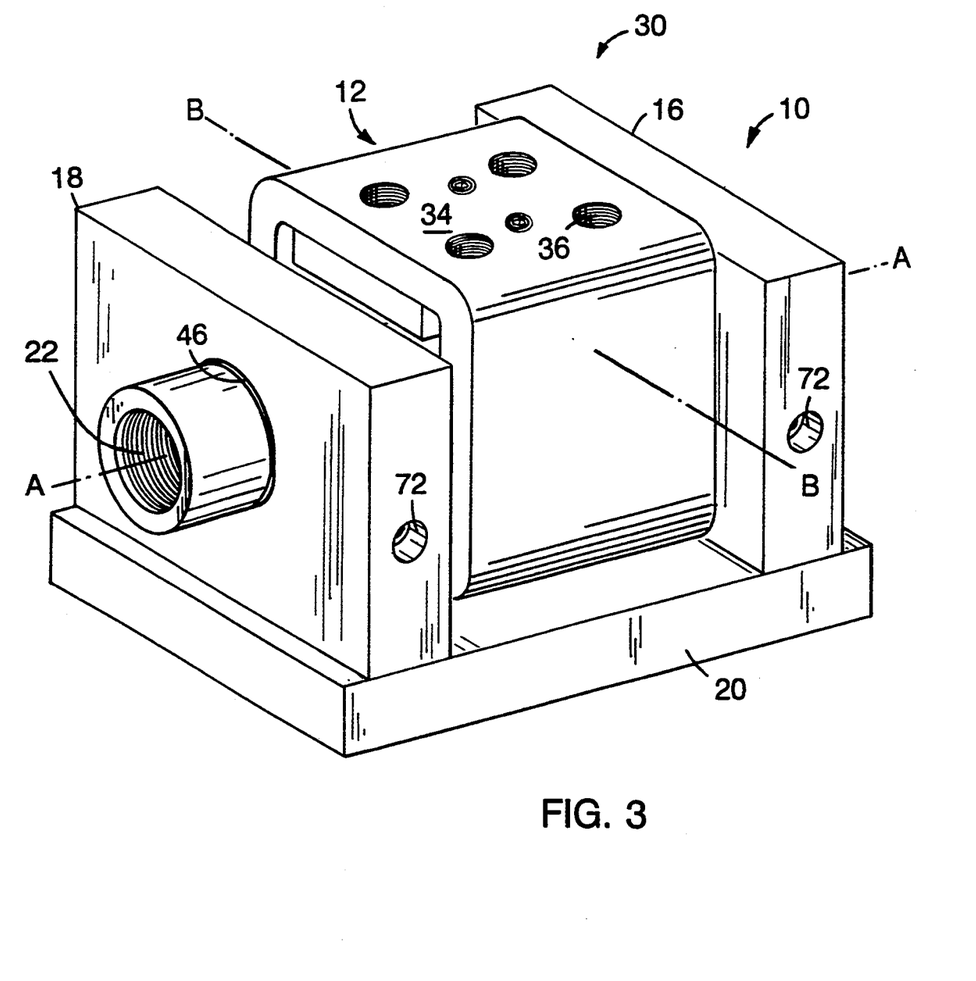
FIG. 3 shows the strain gauge transducer fully assembled, with the load beam module of FIG. 1 supporting the load yoke module of FIG. 2.

FIG. 3 shows strain gauge transducer 40 fully assembled. Load yoke module 12 is disposed over load beam 14 so that load button 32 rests within cup 28 (i.e., load button 32 is positioned on axial centerline 15). Load yoke module 12 is oriented so that axis B of load button 32 is oriented perpendicularly to longitudinal axis A of load beam 14.

Figure 4A:
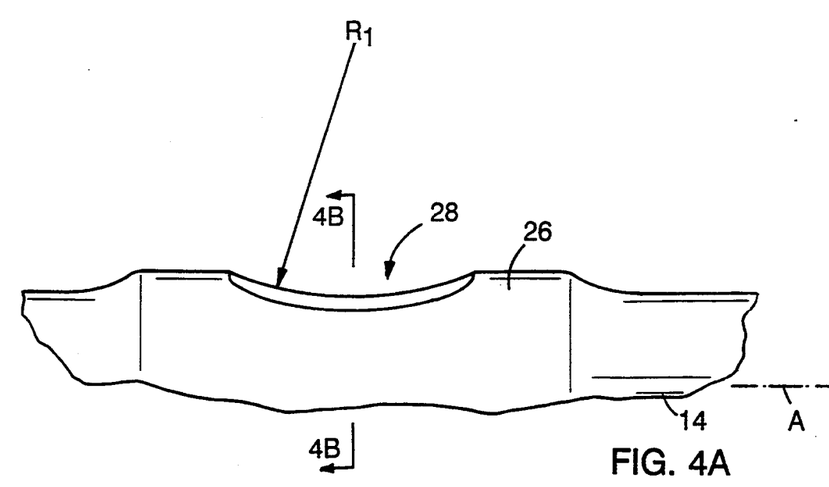
FIGS. 4A and 4B show details of a portion of the load beam module of FIG. 1.
Figure 4B:
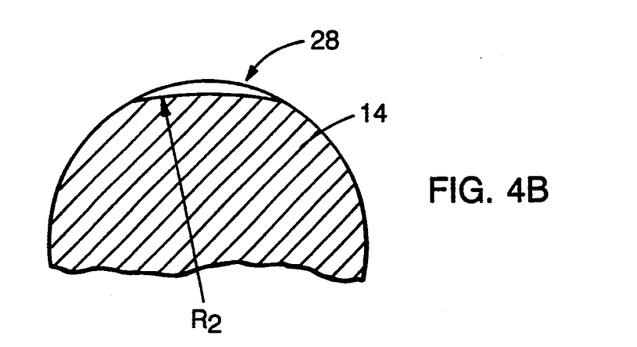

Referring also to FIGS. 4A and 4B, the concavity of cup 28 is slightly less than the curvature of semicylindrical load button 32. For example, concave radius $R_1$ of cup 28 is 1.00 inches, while load button 32 has a curvature radius of 0.875 inches. The degree of convexity of cup 28 along axis B is relatively slight (e.g., convex radius of curvature $R_2$ is 3.00 inches). The shape of cup 28 provides several advantages. The relatively close match between the concavity of cup 28 and the curvature of load button 32 helps retain load button 32 within cup 28 while permitting load button 32 to roll on load beam 14 about axis B. Preventing load yoke module 12 from sliding along load beam axis A maintains load yoke module 12 at the axial center of load beam 14 so that the weight of the load is applied equally to strain gauges 24a, 24b, thereby ensuring accurate measurement. The convex shape of cup 28 allows load button 32 to pivot about beam axis A with little friction and slide on load beam 14 in a direction perpendicular to axis A.

Thus, the engagement between saddle-shaped cup 28 and semi-cylindrical load button 32 essentially provides a "floating" mounting arrangement that allows load yoke module 12 to pivot about two axes (A and B) and slide transversely to load beam 14 (i.e., along axis B) in response to shifts in the load (induced by, e.g., thermal expansion and contraction). By inhibiting load yoke module 12 from sliding along load beam 14 (i.e., in the direction of axis A), the mounting arrangement ensures that load forces are applied equally to strain gauges 24a, 24b for highly accurate measurement. In addition, the saddle shape of cup 28 provides a generally circular- or elliptical-shaped contact area with load button 32 that is larger than that which would be provided if cup 28 was not both concave and convex in shape. The relatively large contact area causes the weight of the load to be somewhat distributed on load beam 14, thereby reducing the risk that heavy loads will deform load beam 14.

Figure 5:
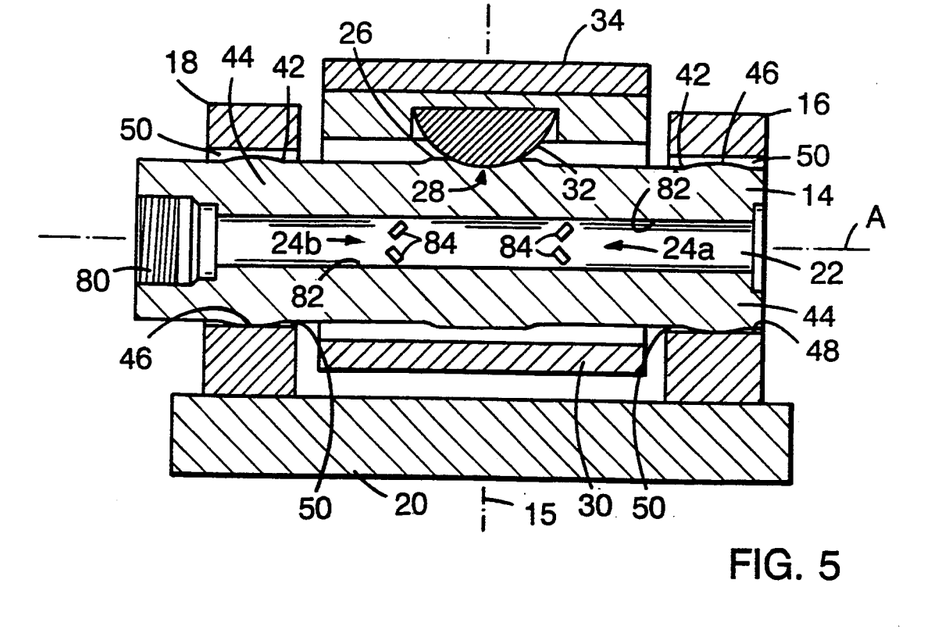
FIG. 5 is a cross-sectional view of the assembled strain gauge transducer of FIG. 3.

Referring to FIG. 5, the constructional details of strain gauge transducer 40 can be readily appreciated. Side walls 16, 18 and base 20 are made from hardened steel. Each side wall 16, 18 defines an opening 42 for receiving an end 44 of load beam 14 (which is also made from hardened steel). Although openings 42 may be circularly-shaped, as discussed below with reference to FIG. 6, applicant has found that a better approximation of the simply supported beam model is obtained by configuring the lower portions of openings 42 to be parabolic (or hyperbolic). Load beam ends 44 are vertically captured within openings 42 by side walls 16, 18, thereby providing anti-lift protection (i.e., preventing load beam 14 from being lifted from load beam module 10 by shifts in the position of the load).

Load beam ends 44 include raised crowns 46 that engage the interior surfaces 48 of openings 42. Each crown is curved, defining a segment of a sphere (the radius of curvature of which is 2.0 inches) that extends approximately 1.0 inch axially on load beam 14. Thus, crowns 46 provide spaces 50 between the other portions of ends 44 and interior surfaces of openings 42, and also define a curved interface with interior surfaces 42. Crowns 46 allow ends 44 to "roll" (i.e., pivot) within side walls 16, 18 as load beam 14 is deflected downwardly by the weight of the load, further enhancing the simply supported beam approximation.

Figure 6:
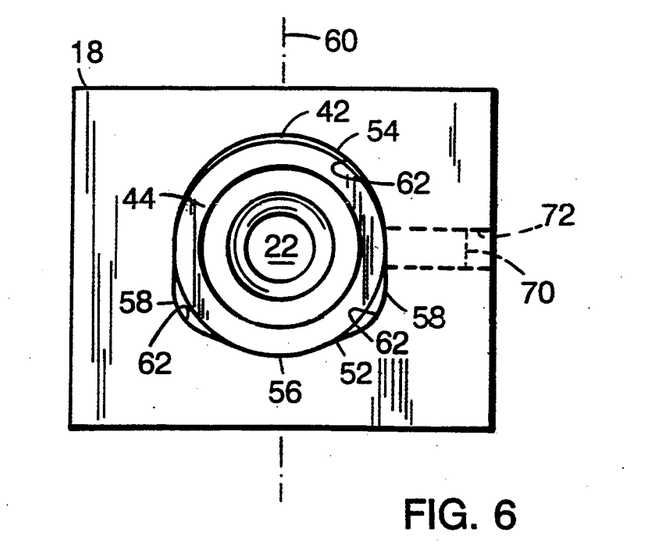
FIG. 6 shows the engagement between a load beam and a side wall of the load beam module of FIG. 1.

FIG. 6 shows side wall opening 42 in wall 18 that receives a crowned end 44 of load beam 14 (opening 42 in side wall 16 is identical). Lower region 52 of opening 42 is approximately shaped as a parabolic cylinder, while the upper region 54 of opening 42 is semi-cylindrical in shape. The radii of curvature of upper region 54 and the bottom 56 of lower region 52 are equal (e.g., 1.363 inches) and are larger than the radii of curvature of sides 58 of lower region (which are, e.g., 0.625 inches). The centers of curvature of upper region 54 and bottom 56 are slightly displaced from each other vertically along centerline 60 of opening (e.g., by 0.03 inches). All curved regions of opening 42 blend smoothly with each other to provide opening 42 with an smooth interior surface 62 for receiving load beam end 44.

The parabolic shape of lower region 52 causes the weight imposed by load beam 14 (and, specifically, by crowns 46) to be distributed over a broader area than would be the case if openings 42 were completely cylindrical. That is, a cylindrical beam contacts the interior surface of a cylindrical opening at a point. Over time, the concentration of forces at the point of contact tends to slightly flatten the bottoms of crowns 46. Although the deformation of crowns 46 would most likely be elastic, the flattening of crowns 46 hinders the ability of crowns 46 to roll within the openings in response to the weight of the load (crowns 46 would instead be required to slide within the openings) and reduces the accuracy with which load beam 14 approximates a simply supported beam.

The radius of curvature of the parabola defined by lower region 52 exceeds that of crowns 46, and thus the contact area between crowns 46 and interior surface 62 of openings 42 is parabolic in shape. The increased contact surface area more widely distributes the forces from load beam 14, thereby reducing the extent to which crowns 46 elastically flatten during use. Crowns 46 thus remain substantially free to roll within openings 42 in response to the weight of the load. As a result, beam 14 closely approximates the simply supported beam model even in the presence of heavy loads. Because upper region 62 does not support the weight of beam 14 and the load, its semi-cylindrical configuration does not cause flattening of crowns 46.

Figure 7:
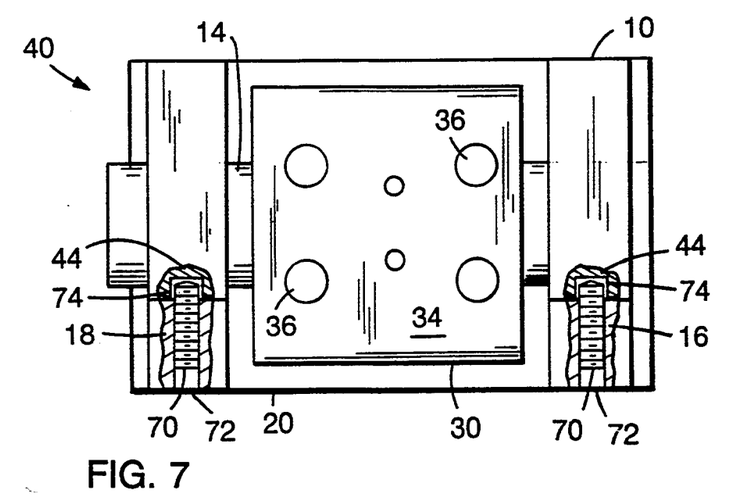
FIG. 7 is a top view, partially cut away, of the assembled strain gauge transducer of FIG. 3.

Referring to FIG. 7, load beam ends 44 are held in place within side walls 16, 18 by set screws 70, each of which are threaded into an opening 72 (FIG. 1) in a side wall 16, 18. The ends of set screws 70 are disposed within cylindrical cavities 74 in load beam ends 44, but are not threaded within cylindrical cavities 74 so as not to interfere with the rolling of load beam 14.

Referring again to FIG. 5, bore 22 is disposed at the radial center of load beam 14 and passes completely therethrough between ends 44. One end 80 of bore 22 is enlarged and is threaded to receive an electrical connector for strain gauges 24a, 24b (neither the connector nor the electrical wiring to strain gauges 24a, 24b are shown). The connector seals that end of bore 22; the opposite end of bore 22 is sealed by a cap (not shown). Strain gauges 24a, 24b are disposed on the curved interior surface 84 of bore 22 and are equally spaced from axial centerline 15 of load beam 14. Each set of strain gauges 24a, 24b includes four individual resistors 84 (only two resistors 84 of each set 24a, 24b are shown) that are disposed in pairs spaced by 180° on interior surface 82. That is, the two pairs of resistors 84 of each set 24a, 24b are disposed on a horizontal plane that bisects load beam 14 along axis A. (Put another way, looking into bore 22 from end 80, one would see one pair of resistors of each set 24a, 24b at the 3:00 o'clock position, and the other pair of resistors at the 9:00 position).

As shown, resistors 84 of each pair are oriented at opposite 45° angles with respect to centerline 15 (i.e., with respect to the direction that beam 14 is loaded). As a result, one resistor 84 in each pair measures beam compression in response to the load, while the other resistor 84 of the pair measures the tension produced by the load in beam 14. Resistors 84 are interconnected in series to form a Wheatstone bridge. Each arm of the Wheatstone bridge includes a pair of resistors, one each from set 24a and set 24b. As a result, the Wheatstone bridge remains in balance even if the load moves somewhat along axis A, because the axial movement of the load tends to cause the resistances of each resistor in the pair to change by equal and opposite amounts. Thus, the total resistance of the Wheatstone bridge changes only in response to changes in the weight of the load, rather than as a function of axial shifts in the load.

In operation, strain gauge transducer 40 is situated so that base 20 lies flat on a stationary support (not shown) which, depending on the application, may be the earth. A load (not shown, but which can include such structures as storage vessels) is placed on load yoke module 30 by attaching it to table surface 34 (either directly or through a separate mounting plate that is bolted to surface 34). Typically, the vessel will include gussets or the like arranged at three or four locations around the perimeter of the load for attachment to one or more strain gauge transducers 40. The capacity of strain gauge transducer 40 is intended to range from 50,000 to 500,000 lbs.

The weight of the load causes load button 32 to apply a downward force to the center of load beam 14 that causes the center of load beam 14 to flex toward base 20. The downward force applied to the center of load beam 14 also causes load beam ends 44 to roll about crowns 46 within openings 42, thereby enhancing the simulation of beam 14 as a simply supported beam. The relatively large thicknesses of side walls 16, 18 and base 20 helps side walls 16, 18 from collapsing toward each other or being pushed apart by the weight of the load. The amount by which the load causes load beam 14 to flex thus accurately reflects the amount of force applied by the load. The amount of flexure of load beam 14 is measured by strain gauges 24a, 24b mounted within load beam 14, from which measurement conventional external electronic circuitry (not shown) determines the amount of the load applied to load button 32.

The downward force caused by the load attached to table surface 34 is directly transferred to load beam 14 through load button 32. Due to the semi-cylindrical shape of load button 32 and the saddle-shaped configuration of cup 28, the force applied by the load is distributed over a circular (or elliptical) area about centerline 15 of load beam 14. This helps avoid the surface of load beam 14 becoming dented or otherwise distorted by the weight of the load. The circular (or elliptical) contact area is sufficiently small so as not to provide undue friction that would impede load button 32 from pivoting on load beam 14 about both axes A and B or sliding along axis B in response to shifts in the load. As discussed, the slightly convex shape of cup 28 along axis B facilitates the pivoting and sliding of load button 32 in response to thermally-induced expansion and compression of the load. This floating mounting arrangement greatly reduces the risk of damage or breakage of the gusset used to mount the load to strain gauge transducer 40.

Furthermore, the highly convex profile of cup 28 along axis A provides self-location of contact between semi-cylindrical load button 32 and load beam 14 and greatly assists in preventing load button 32 from sliding along load beam 14. As a result, the load is maintained equally spaced from strain gauges 24a and 24b to effectively eliminate measurement errors that would otherwise result from shifts in the position of the load.

Other embodiments are within the scope of the following claims.

Figure 8:
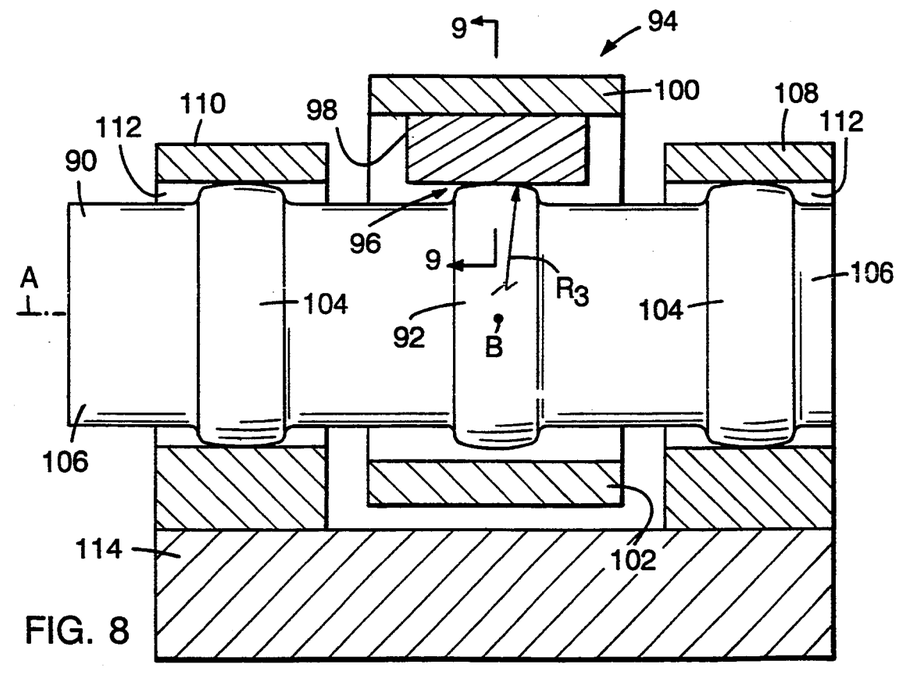
FIGS. 8 and 9 illustrate an alternative embodiment of the strain gauge transducer of the invention.
Figure 9:
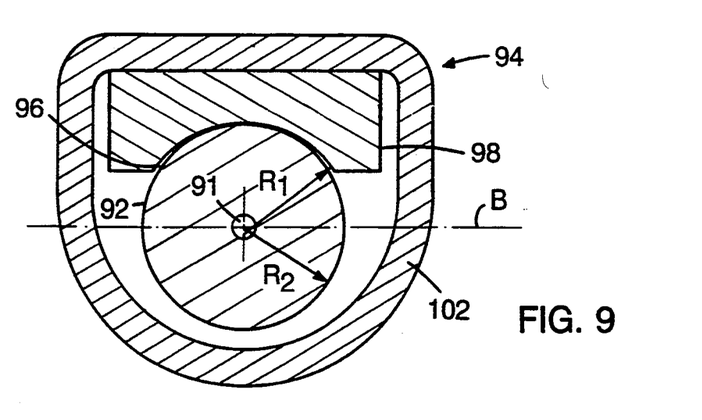

For example, referring to FIGS. 8 and 9, load beam 90 has an enlarged, convex flange 92 that does not include a cup 28 (FIG. 1) for receiving load yoke module 94. Instead, a cup-shaped depression 96 is disposed in the underside of a mounting plate 98 of load yoke module 94 engages flange 92. Flange 92 and cup 96 provide a floating mounting arrangement that allows load yoke module 96 to pivot about two axes— the longitudinal axis A of load beam 90 and the axis B along which load yoke module 94 is disposed.

Cup 96 is highly concave in the direction of B axis and is flat in the direction of axis A. For example, concave radius $R_1$ of cup 96 is 1.625 inches, only slightly greater than radius $R_2$ of flange 92 (1.544 inches).

Flange 92 is crowned in the direction of axis A to facilitate pivoting of load yoke module 94 about axis B. For example, flange 92 has a radius of curvature $R_3$ in the A axis direction of 2.00 inches.

Plate 98 is attached to the underside of table 100 of load yoke assembly 94 by a pair of bolts (not shown). As may be appreciated from FIG. 9, the portion 102 of the load yoke housing disposed beneath table 100 is arched-shaped.

During use, the engagement of cup 96 and crowned flange 92 facilitates pivoting of load yoke module 94 about axis B, while also allowing load yoke module 94 to slide axially by small amounts on load beam flange 92. The concave shape of cup 96 along axis B captures load yoke module 94 on flange 92 (i.e., prevents module 94 from sliding along axis B) while allowing load yoke module 94 to pivot freely about axis a of load beam 90. Thus, the strain gauge transducer accommodates to shifts in load position without placing undue stress on gussets and other hardware that secures the load to table 100.

Load beam 90 includes a central bore 91 within which two sets of strain gauges are mounted (the strain gauges are not shown, but are mounted in the same manner as described above). Load beam 90 is also equipped with crowns 104 for facilitating rolling of ends 106 within side walls 108, 110 as load beam 90 flexes. Crowns 104 are slightly smaller than flange 92. In addition, openings 112 in side walls 108, 110 have the same parabolic shape as described above and shown in FIG. 6. Side walls 108, 110 and base 114 are relatively thick to remain stationary even when relatively heavy loads are applied.

Still other embodiments are within the scope of the claims.

For example, in some applications in which load beam 14 need not closely resemble a simply supported beam model (and thus ends 44 of load beam 14 need not roll within stationary side walls), it may be desirable to allow side walls 16, 18 of strain gauge transducer 40 to flex inwardly (i.e., toward each other) when the load is applied. In this case, base 20 is made thin relative to side walls 16, 18, and crowns 46 may be omitted. A metal strap that is weak in compressive strength but strong in tensile strength may be connected between side walls 16, 18. The strap would help avoid side walls 16, 18 being pushed apart in response to shifts in the load without substantially impeding side walls 16, 18 from flexing inwardly.

The openings in the side walls may have other shapes. For example, lower region 52 of openings 42 (FIG. 6) can have a hyperbolic configuration. This would change the shape of the contact area with crown 46 to hyperbolic. Lower region 52 can alternatively have a cylindrical shape, particularly if heavy loads that may deform crowns 46 are not expected.

In addition, openings 42 may be made slightly convex along axis A to receive the curvature of crowns 46. This would further facilitate rolling, but the increased contact area between crowns 46 and interior surfaces 62 would impose additional lateral forces on side walls 16, 18.

Other arrangements may be used to retain load yoke module 12 at the axial center of load beam 14. For example, an annular groove may be formed in load beam 14 in place of cup 28 to receive load button 32.

Side walls 16, 18 can be made from a softer steel, if desired. If so, hardened steel sleeves should be included for receiving load beam 14.

Finally, central bore 22 need not pass entirely through load beam 14 but may instead be drilled partially through load beam 14 from each end. Care should be taken, however, to ensure that the two bores are radially aligned, or sets of strain gauges 24a, 24b will respond differently to the weight of the load.

What is claimed is:

1. Apparatus for measuring load force, comprising
an elongated load member generally disposed along a longitudinal axis and supported at an end thereof so that a region of said load member horizontally spaced from said end is suspended vertically above a base of said apparatus, said region of said load member being configured to receive a load force applied in a direction transverse to said axis, said load member being made from a material configured to flex in the transverse direction toward said base in response to the load force,
a device supported by said load member in said region for measuring an amount of flexure of said material caused by the load force,
said load member being constructed so that said material surrounds said device around a circumference of said load member in said region.

2. The apparatus of claim 1 wherein said load member includes a bore disposed axially therein and surrounded by said material, said device being disposed on a surface of said bore within said load member.

3. The apparatus of claim 2 wherein said bore extends completely through said load member.

4. The apparatus of claim 2 wherein said device includes at least one strain gauge disposed on said surface of said bore.

5. The apparatus of claim 4 wherein said device includes a plurality of strain gauges, a first set of said strain gauges being axially spaced from each other in said load member.

6. The apparatus of claim 5 wherein a second set of said plurality of strain gauges are circumferentially spaced from said first set of said strain gauges on said surface of said bore.

7. The apparatus of claim 6 wherein said circumferentially spaced strain gauges are spaced by 180°.

8. The apparatus of claim 5 wherein said bore is continuous between said axially spaced strain gauges.

9. Apparatus for measuring load force, comprising
an elongated load member supported in a horizontal orientation along a first axis above a base and configured to flex vertically toward said base in response to the load force, said load member supporting a device for measuring an amount of flexure of said load member caused by the load force,
a mounting member disposed on said load member in contact with said load member at a region positioned a selected distance from said device along said first axis, said mounting member being oriented along a second axis transverse to said first axis and configured to receive the load force and transfer the load force to said load member,
at least one of said load member and said mounting member having a depression in a surface thereof in the region in which said load member and said mounting member are in contact, said depression defining a non-hemispherical surface configured to allow said mounting member to pivot about one of said axes and roll about another one of said axes in response to changes in a direction in which said load force is applied and to inhibit said mounting member from moving along one of said axes.

10. The apparatus of claim 9 wherein said depression is in a surface of said load member for receiving said mounting member, said depression being configured to allow said mounting member to pivot about said first axis and roll about said second axis and inhibit said mounting member from moving along said first axis.

11. The apparatus of claim 10 wherein said device includes at least two strain gauges that are spaced from said depression by equal amounts along said first axis.

12. The apparatus of claim 10 wherein said first axis and said second axis are perpendicular to each other, said depression defining a surface that is concave along said first axis, said mounting member including a curved portion configured to rest on said concave surface, thereby to facilitate rolling of said mounting member about said second axis.

13. The apparatus of claim 12 wherein said concave surface has a radius of curvature that is greater than a radius of curvature of said curved portion.

14. The apparatus of claim 12 wherein said depression defines a surface that is convex along said second axis to facilitate pivoting of said mounting member about said first axis.

15. The apparatus of claim 14 wherein said depression generally defines a cup disposed on said load member.

16. The apparatus of claim 15 wherein said region of said load member on which said cup is disposed has a diameter that is enlarged relative to a diameter of other regions of said load member.

17. The apparatus of claim 9 wherein said load member includes an enlarged region and said depression is in a surface of said mounting member aligned with said enlarged region, said enlarged region and said depression being configured to allow said mounting member to roll about said first axis and pivot about said second axis and inhibit said mounting member from moving along said second axis.

18. The apparatus of claim 17 wherein said first axis and said second axis are perpendicular to each other, said enlarged region being curved along said second axis and said depression defining a surface that is concave along said second axis to receive said enlarged region, thereby to facilitate rolling of said mounting member about said first axis.

19. The apparatus of claim 18 wherein said concave surface has a radius of curvature that is greater than a radius of curvature of said enlarged region.

20. The apparatus of claim 19 wherein said depression generally defines a cup disposed on an underside of said mounting member.

21. The apparatus of claim 9 wherein said second axis is perpendicular to said first axis.

22. Apparatus for measuring load force, comprising
a load member oriented along a first axis and configured to flex in response to the load force, said load member having a bore disposed axially therein and supporting a plurality of strain gauges on a surface of said bore for measuring an amount of flexure of said load member caused by the load force, each said strain gauge being spaced along said first axis by a selected amount from an axial center of said load member,
structure for supporting said load member, said structure including a pair of side walls having openings for receiving ends of said load member to elevate said load member with respect to a base of said structure,
said ends of said load member including enlarged regions for engaging interior surfaces of said openings and spacing remaining regions of said ends that are disposed within said side walls from said interior surfaces to facilitate rolling of said ends of said load member within said openings as said load member flexes in response to the load force, and
a mounting member disposed on said load member at the axial center thereof and oriented along a second axis for receiving the load force and transferring the load force to said load member,
said load member and said mounting member being configured to allow said mounting member to pivot about one of said axes and roll about another one of said axes on said load member and to inhibit said mounting member from moving along one of said axes.

23. The apparatus of claim 1 wherein said load member is supported at opposite ends thereof above said base.

* * * * *